Oct. 27, 1936.  J. G. CAPSTAFF  2,058,409
APPARATUS FOR REPRODUCING GOFFERED FILMS
Filed March 10, 1934
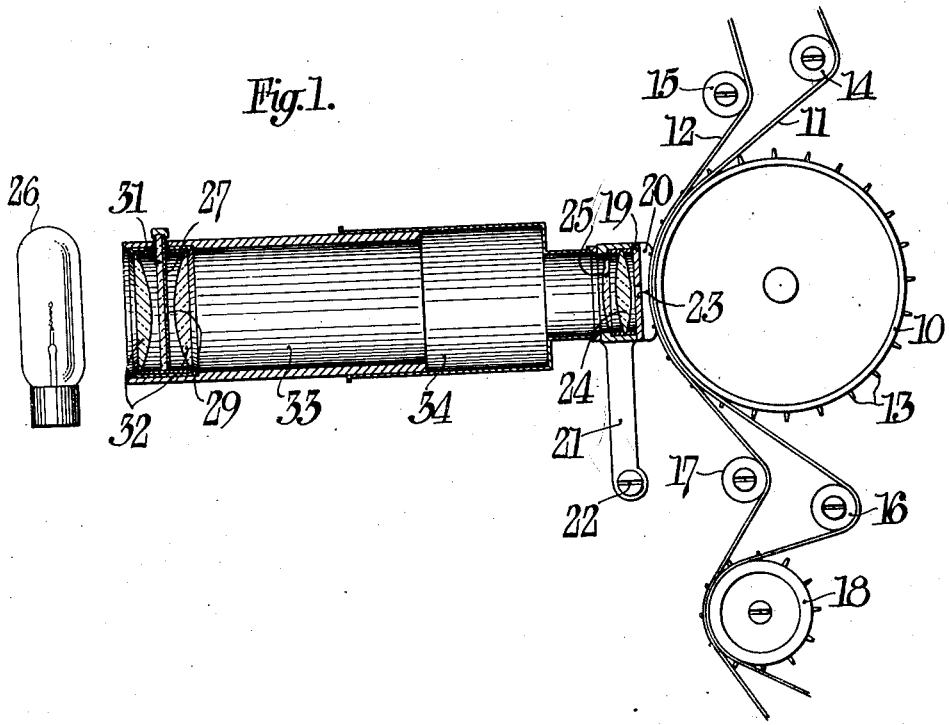
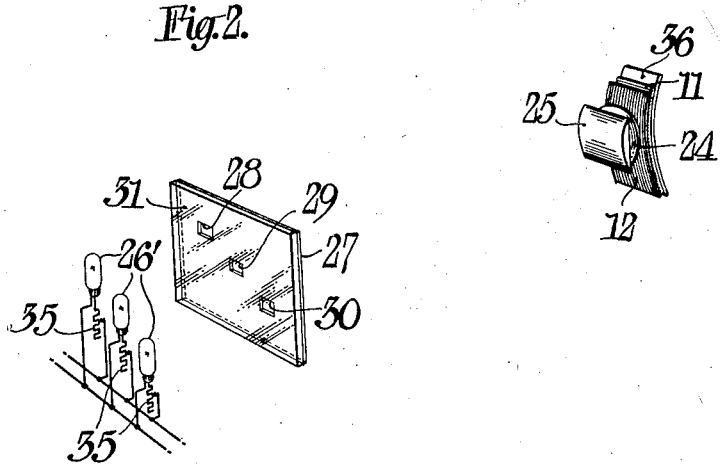
Inventor:
John G. Capstaff,
By Newton M. Perrins
Rolla N. Carter
Attorneys.

Patented Oct. 27, 1936

2,058,409

UNITED STATES PATENT OFFICE 2,058,409

APPARATUS FOR REPRODUCING GOFFERED FILMS

John G. Capstaff, Rochester, N. Y., assignor, by mesne assignments, to Eastman Kodak Company, Jersey City, N. J., a corporation of New Jersey Application March 10, 1934, Serial No. 714,980

3 Claims. (Cl. 95—75)

My invention relates to color photography and more particularly to an apparatus for making prints or duplicates on lenticular stock from negative or positive lenticular color films.

Several methods have been proposed for continuously printing by contact films provided with cylindrical lenticulations or embossings but up to the present time no satisfactory process has evolved. Apparently every worker in attempting to print such films continuously and by contact has been faced with the dilemma of trying to choose between bad moiré effects and poor definition. In every such process known to applicant these two defects are functionally related so that good definition produces bad moire and elimination of the moire is possible only by impairing the definition. By means of my present invention line goffered films may be continuously printed by contact with satisfactory definition and without objectionable moiré effects.

In practising the present invention, I make use of a special source of light of the general type shown in U. S. Patent 1,935,422 to Jean L. Vidal. The film to be copied is placed with its image side in intimate contact with the embossed side of the raw film and with the lenticulations of one film at a substantial angle to the lenticulations of the other film to eliminate moiré effects. Such intimate contact is obtained by training under tension the two films over a curved support which serves as a solid backing for the raw film. With this arrangement the light from the special source is incident on the convex faces of the two films and to compensate for this convexity of the films a cylindrical refracting surface is introduced in front of the films. In order for the printing to be done with continuous movement of the films the special light source or sources must be made to appear at infinity as viewed by the lenticulations on the films and I accomplish this by introducing a spherical refracting surface in front of the films.

My invention will be clearly understood from the following description when taken in connection with the accompanying drawing and its scope will be pointed out in the appended claims.

Fig. 1 is a diagrammatic elevation in section of an arrangement for practising my invention; and Fig. 2 is a perspective view of an optical arrangement employing a plurality of primary light sources.

In Fig. 1 I have shown diagrammatically certain of the film handling mechanism of a conventional continuous printer including a drum sprocket 10 for supporting in a curved plane the sensitive film 11 and the original film 12. For simplicity, the sensitive film will hereinafter be referred to as the positive film and the original as the negative film. Drum sprocket 10 is driven in any convenient manner, and is provided with teeth 13 which fit into the film perforations, thus registering as well as moving the films 11 and 12. The two films 11 and 12 are drawn from their supply reels (not shown) and under guide rollers 14 and 15, respectively, by the drum sprocket 10. After passing over the sprocket 10 the films 11 and 12 are trained over guide rollers 16 and 17, respectively, and thence over a sprocket 18 to take up reels (not shown). The sprocket 18 is preferably driven in a way to place the two films under tension as by a tendency drive or providing the sprocket 18 with a spring mounting. In this way the films are stretched over the sprocket 10 under tension and will pass thereover in intimate contact and the cylindrical form of the sprocket 10 insures a backing over the entire surface of the positive film 11 as it passes over the sprocket 10.

Opposite the portion of the sprocket 10 supporting the films is a gate member 19 provided with pressure pads 20 having concave faces whose curvatures conform to that of the sprocket 10. The gate member 19 is carried upon a swinging arm 21 rotatably mounted upon a stud 22 which may be mounted upon any suitable portion of the printer frame. The gate member 19 is provided with a printing gate or aperture 23 and also forms a mount for lenses 24 and 25 whose functions will be pointed out below.

The special illuminating system for printing in accordance with my invention may assume a variety of forms as long as certain conditions are fulfilled and is shown in Fig. 1 as comprising an ordinary lamp 26 positioned to project light through a special diaphragm 27, the lenses 25 and 24, and the printing gate 23 to the films 12 and 11 supported by the sprocket 10. As best shown in Fig. 2 the diaphragm 27 is made of any desired opaque material and provided with three rectangular openings 28, 29 and 30 arranged along the median line between the lenticulations of the two films 11 and 12 which are here shown as being horizontal and vertical. In accordance with a well known principle, these three openings represent the areas where the three color bands of the camera filter register with similar color bands of the projecting machine filter to be used with the positive film 11 being printed. In practice, I prefer to make the openings 28, 29 and 30 smaller than the actual overlapping areas of the color bands for I have found that this arrangement tends to improve color saturation in the positive film.

The process requires that all three of the openings 28, 29 and 30 appear to all parts of the gate 23 to be of equal brightness and each opening must occupy the same angular position relative to all parts of the gate 23. The first requirement may be satisfied by positioning a ground glass plate 31 in front of the diaphragm 27 but other expedients may be used to accomplish the same purpose. The second requirement may be satisfied by providing the collimating lens 24 which causes the openings 28, 29 and 30 to appear to the films behind the gate 23 to be at infinity. The cylindrical lens 25 compensates for the convexity of the films at the printing position.

The light efficiency of the system is greatly improved by providing condenser lenses 32 on either side of the diaphragm 27 although of course both lenses 32 of the condenser may be in front of the diaphragm 27. The condenser lenses 32 and the diaphragm 27 as shown are mounted in a cylindrical tube 33 which is provided with a telescopic tube 34 which is slidable away from the gate member 19 to permit it to be swung away from printing position for threading the films over the sprocket 10.

In Fig. 2, which shows essentially the same arrangement as shown in Fig. 1, the light source comprises three individual lamps 26' each of which is supplied with an adjustable resistance 35 in its supply circuit whereby the intensity of the several lamps 26' may be separately regulated to bring them to the same intensity or to different intensities if it is desired to introduce a certain color correction in the printed film. The sprocket 10 has been replaced with a curved plate 36 over which the films 11 and 12 may be drawn under the desired tension in any convenient well known manner.

While the negative film 12 and the positive film 11 have been illustrated and described as having longitudinal and transverse lenticulations, respectively, and I prefer this arrangement because of the opposite buckling tendencies in the camera and projector, obviously other arrangements may be employed.

It will be noted that contrary to usual practice I feed the image bearing film 12 over the convex face of the virgin film 11 and this departure forms an important feature of my invention. Due to this reverse order of the films on the printing sprocket the negative film for use in a camera is provided with perforations spaced apart a greater distance than is present practice so that after development and the consequent shrinkage the spacing of the perforations will be slightly greater than those in the virgin film and accordingly the two films will pass over the printing sprocket without difficulty.

It is to be understood that the mechanical features of the continuous printer illustrated are merely conventional and that the invention resides in the modifications and method of use which include the special lighting and optical arrangements and the disposition of the two films upon a convex support or backing member at the printing station.

It is to be further understood that in both of the figures I have purposely made the showing largely diagrammatic or schematic, with some parts in section, so that the optical principles which underlie it and which constitute the real features of my invention may be clear. It is obvious that the mechanical details are in a large part those which are standard practice in this art, and a complete showing thereof would merely obscure the actual invention. The present showing is, however, sufficient for anyone skilled in the art to make and use the invention.

Many changes and modifications may well be made without departing from the spirit and scope of the invention and I intend to cover all such changes and modifications in the appended claims.

What I claim as new and desire to secure by Letters Patent of the United States is:

1. A printer for copying pictures from a line goffered film to sensitive film having line goffering at a substantial angle to those on the first mentioned film comprising means for continuously advancing the two films through an exposure position with the gofferings of the sensitive film in contact with the picture side of the other film, a solid member for supporting the two films convexly curved toward the incident light as they pass through the exposure position, a source of light, a diaphragm located between the source of light and the two films and having a series of apertures located on the median line between the film gofferings, a collimating lens for causing said apertures to appear at infinity as viewed by the films and a cylindrical lens for compensating for the convexity of the two films at the exposure position.

2. Apparatus for printing by contact from an original film having cylindrical lenticulations extending longitudinally thereof onto a sensitive film having cylindrical lenticulations extending transversely thereof which comprises a printing gate, a solid sprocket member for supporting the two films in contact behind the printing gate and with their lenticulations facing said gate whereby the two films are convex toward said gate, a diaphragm having a series of apertures located on the median line between the lenticulations of the two films, means for illuminating uniformly each of said apertures, an optical system between said films and the diaphragm for compensating for the convexity of the two films and for causing said apertures to appear at infinity as viewed from the films and means for advancing said films past said gate with a uniform movement.

3. Apparatus for printing from an original film provided with cylindrical lenticulations onto a virgin film provided with cylindrical lenticulations extending substantially transversely of the lenticulations on the original film which comprises a printing station, means for nonintermittently feeding under tension the two films in contact in a curved path through the printing station with the lenticulations of both films facing the incident light and being curved convexly thereto, means for supporting the entire concave face of the virgin film during its passage through the printing station, a diaphragm having openings corresponding to the overlapping colors of like color bands parallel to the lenticulations of the two films respectively, means for projecting light through the diaphragm and onto the films at the printing station, and optical means for causing said diaphragm openings to appear at infinity as viewed from the films and for compensating for the curvature of the two films at the printing station.

JOHN G. CAPSTAFF.